US012671512B2

(12) United States Patent
Zhang et al.

(10) Patent No.: US 12,671,512 B2
(45) Date of Patent: Jun. 30, 2026

(54) RADIO UNIT TIME ALIGNMENT AND DELAY CHARACTERIZATION

(71) Applicant: Dell Products L.P., Round Rock, TX (US)

(72) Inventors: Weihong Zhang, Ottawa (CA); Wei Liu, Ottawa (CA); Elijah De Groote, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 553 days.

(21) Appl. No.: 18/313,760

(22) Filed: May 8, 2023

(65) Prior Publication Data

US 2024/0380506 A1 Nov. 14, 2024

(51) Int. Cl.
*H04J 3/06* (2006.01)
*H04B 17/00* (2015.01)

(52) U.S. Cl.
CPC ........ *H04J 3/0661* (2013.01); *H04B 17/0085* (2013.01)

(58) Field of Classification Search
CPC .............. H04J 3/0661; H04B 17/0085; H04W 56/0065
See application file for complete search history.

(56) References Cited

U.S. PATENT DOCUMENTS

2005/0286507 A1* 12/2005 Sterling .................. H04L 7/005
370/363
2007/0233467 A1* 10/2007 Oshikiri .................. G10L 19/24
704/E19.044

2014/0334285 A1* 11/2014 Joung ................... H04L 27/265
370/210
2016/0197804 A1* 7/2016 Zinevich ............. H04L 27/2601
370/252
2017/0064653 A1* 3/2017 Griffioen ........... H04W 56/0085
2018/0007736 A1* 1/2018 Ruttik ................... H04J 3/0661
(Continued)

FOREIGN PATENT DOCUMENTS

CN 103188737 A 7/2013

OTHER PUBLICATIONS

Invitation to Pay Additional Fees for PCT Application No. PCT/US2023/036176 mailed Mar. 18, 2024, 11 pages.
(Continued)

*Primary Examiner* — Tejis Daya
(74) *Attorney, Agent, or Firm* — Amin, Turocy & Watson, LLP

(57) ABSTRACT

Radio unit equipment that facilitates radio unit time alignment and delay characterization includes a buffer that stores input data received via a signal ingress point of the radio unit equipment, resulting in buffered data. The radio unit equipment also includes clock generation logic that provides a synchronized frame number (SFN) pulse to the buffer. The buffer releases the buffered data at a time corresponding to the SFN pulse and modified by a timing adjustment parameter, resulting in the buffered data proceeding from the buffer to a signal egress point of the radio unit equipment. Additionally, the buffer determines the timing adjustment parameter based on a defined signal propagation delay between the buffer and the signal egress point of the radio unit equipment.

20 Claims, 12 Drawing Sheets

(56) References Cited

U.S. PATENT DOCUMENTS

2021/0400527 A1\* 12/2021 Notargiacomo .. H04W 28/0284

OTHER PUBLICATIONS

International Search Report and Written Opinion for PCT Application No. PCT/US2023/036176 mailed Aug. 14, 2024, 22 pages.
3GPP "5G; Nr; Base Station (BS) radio transmission and reception" 3GPP TS 38.104 version 15.14.0 Release 15), Sep. 2021, 243 pages.
O-RAN Alliance "O-RAN Working Group 4 (Open Fronthaul Interfaces WG) Control, User and Synchronization Plane Specification", O-RAN Alliance 2021, 319 pages.
O-RAN Alliance "O-RAN Fronthaul Working Group Fronthaul Interoperability Test Specification (IOT)", O-RAN Alliance 2023, 125 pages.
International Preliminary Report on Patentability received for PCT Application Serial No. PCT/US2023/036176 dated Nov. 20, 2025, 15 pages.

\* cited by examiner

100

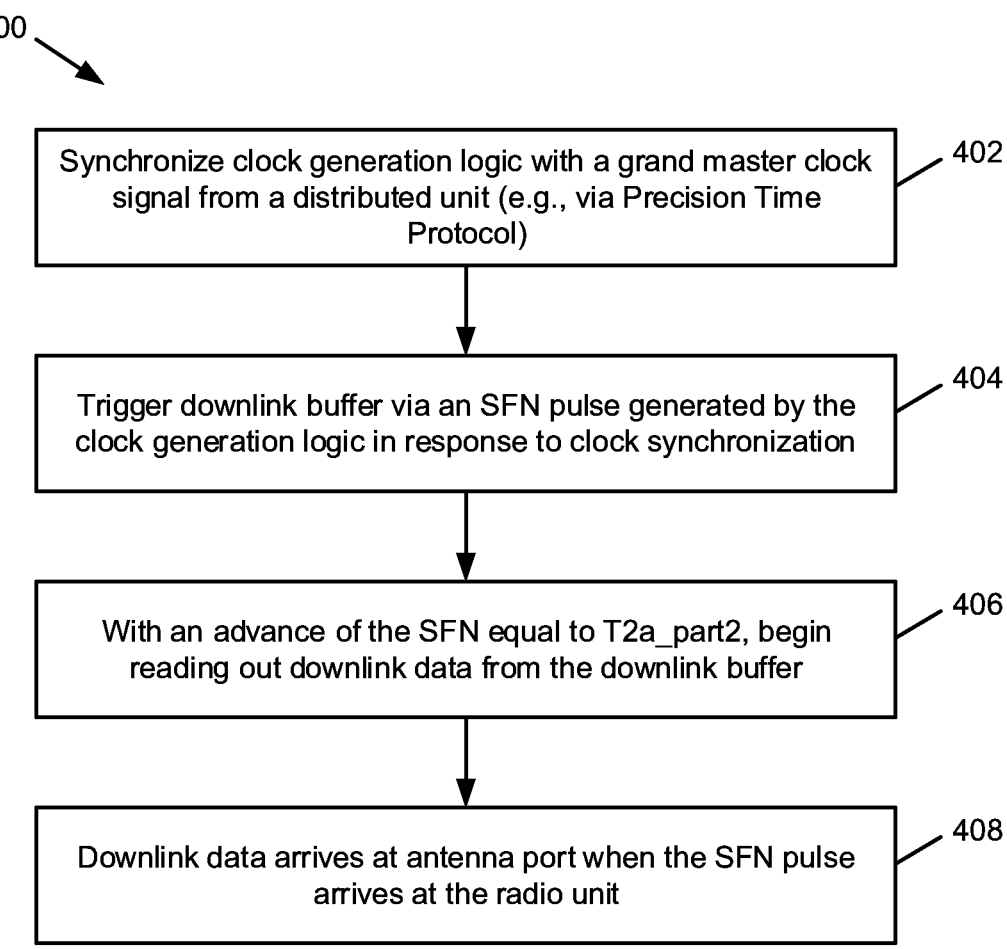

400

Synchronize clock generation logic with a grand master clock signal from a distributed unit (e.g., via Precision Time Protocol) — 402

Trigger downlink buffer via an SFN pulse generated by the clock generation logic in response to clock synchronization — 404

With an advance of the SFN equal to T2a_part2, begin reading out downlink data from the downlink buffer — 406

Downlink data arrives at antenna port when the SFN pulse arrives at the radio unit — 408

FIG. 4

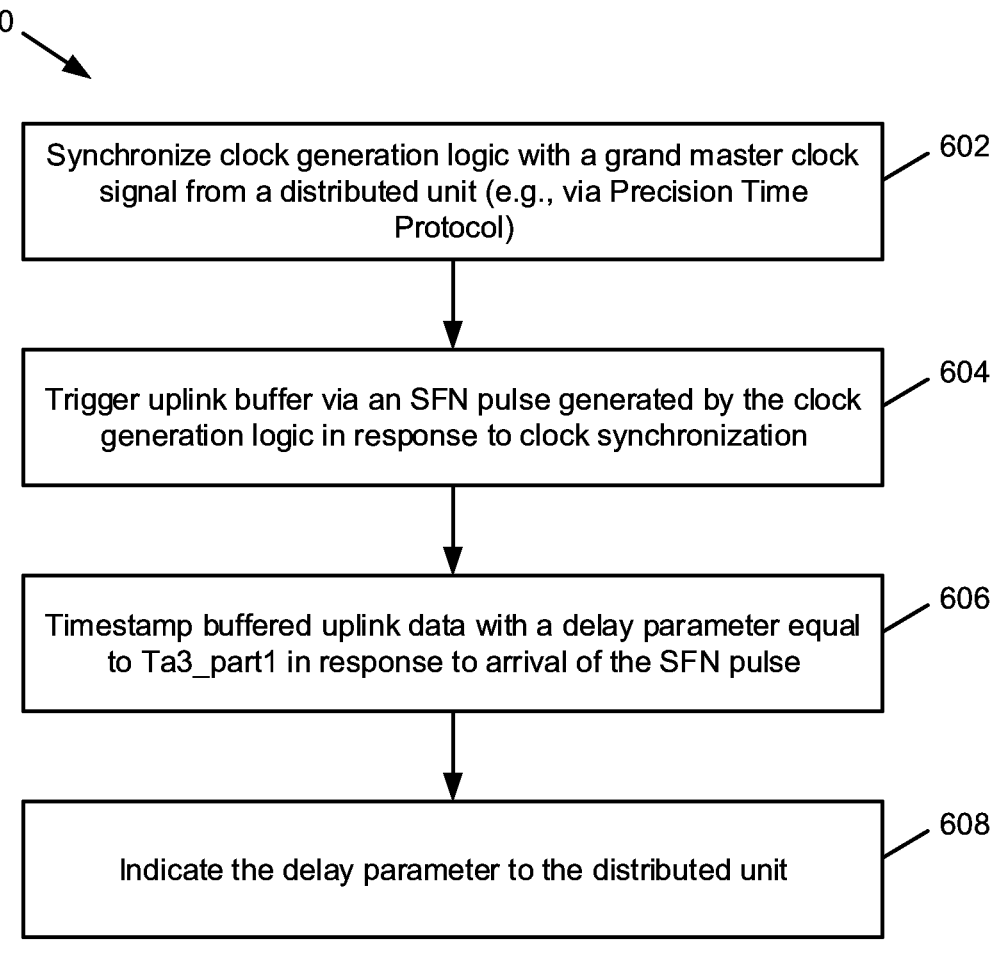

600

Synchronize clock generation logic with a grand master clock signal from a distributed unit (e.g., via Precision Time Protocol) — 602

Trigger uplink buffer via an SFN pulse generated by the clock generation logic in response to clock synchronization — 604

Timestamp buffered uplink data with a delay parameter equal to Ta3_part1 in response to arrival of the SFN pulse — 606

Indicate the delay parameter to the distributed unit — 608

FIG. 6

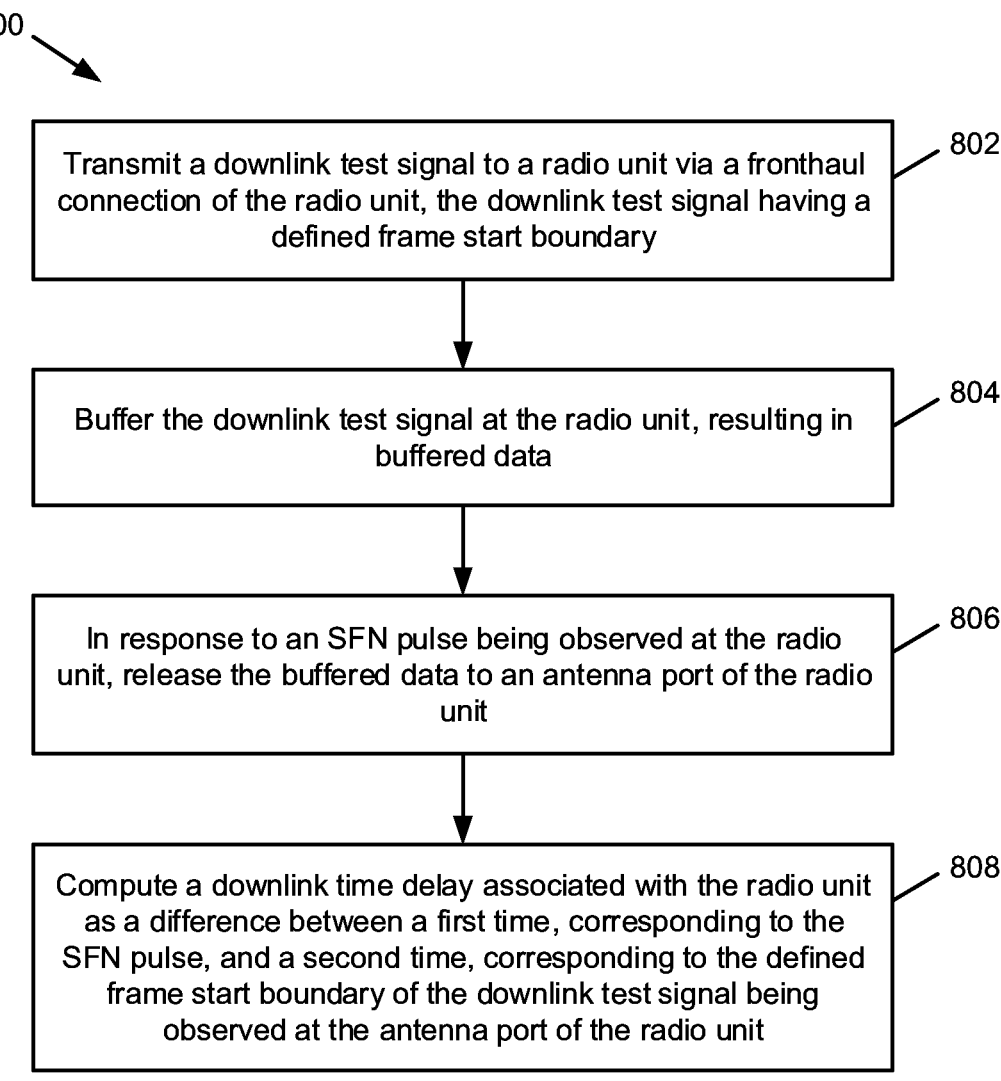

800

Transmit a downlink test signal to a radio unit via a fronthaul connection of the radio unit, the downlink test signal having a defined frame start boundary ⟋ 802

Buffer the downlink test signal at the radio unit, resulting in buffered data ⟋ 804

In response to an SFN pulse being observed at the radio unit, release the buffered data to an antenna port of the radio unit ⟋ 806

Compute a downlink time delay associated with the radio unit as a difference between a first time, corresponding to the SFN pulse, and a second time, corresponding to the defined frame start boundary of the downlink test signal being observed at the antenna port of the radio unit ⟋ 808

FIG. 8

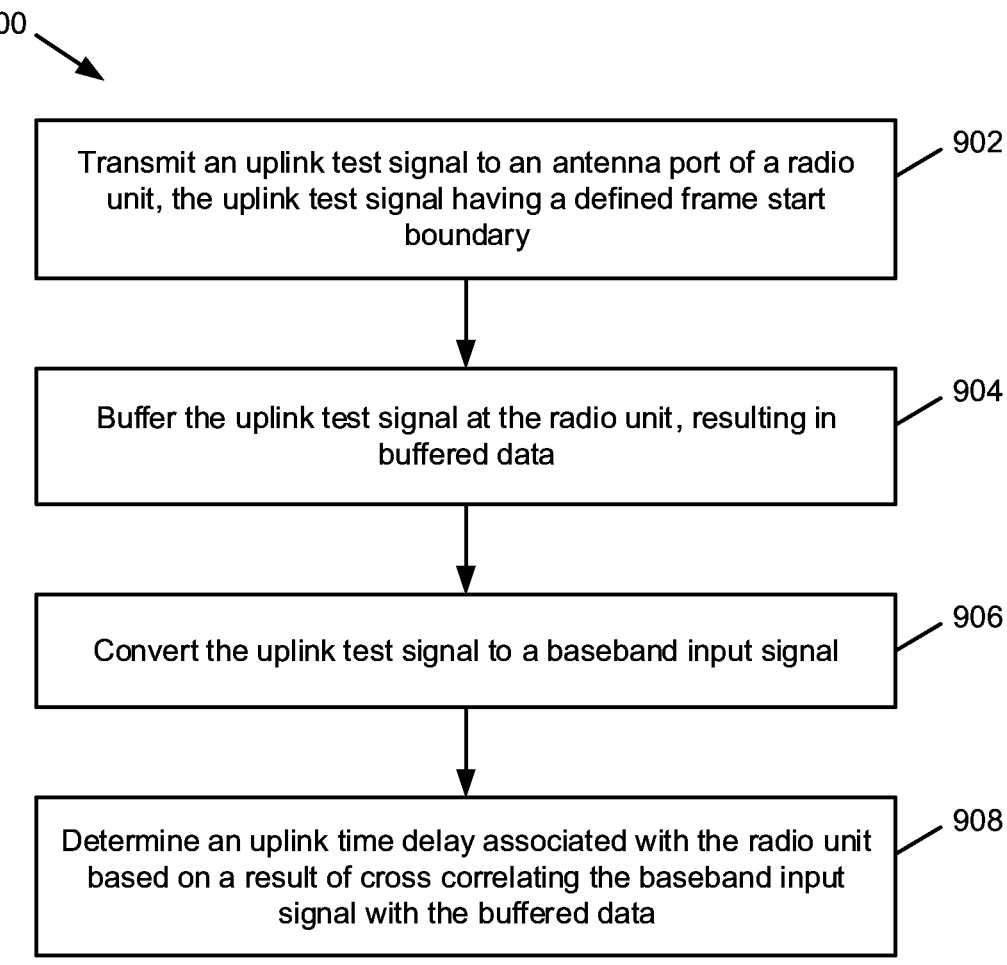

900

902
Transmit an uplink test signal to an antenna port of a radio unit, the uplink test signal having a defined frame start boundary 904
Buffer the uplink test signal at the radio unit, resulting in buffered data 906
Convert the uplink test signal to a baseband input signal 908
Determine an uplink time delay associated with the radio unit based on a result of cross correlating the baseband input signal with the buffered data

FIG. 9

RADIO UNIT TIME ALIGNMENT AND DELAY CHARACTERIZATION

BACKGROUND

In communication networks, such as networks utilizing the Open Radio Access Network (O-RAN) architecture, network throughput can be improved by accurately characterizing and accounting for network and/or device latency. However, accurately determining latency in a network device can be challenging due to, e.g., the use of ethernet packet data that can have variable latency due to the variable nature of network communications as well as the representation of packet data in the frequency domain. These challenges are a particular concern for use cases such as Ultra-Reliable-Low-Latency-Communication (URLLC) applications or the like, which require low and accurate latency designs for proper functionality.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, radio unit equipment is described herein. The radio unit equipment can include a buffer that stores input data received via a signal ingress point of the radio unit equipment, resulting in buffered data, and clock generation logic that provides a synchronized frame number (SFN) pulse to the buffer. The buffer can release the buffered data at a time corresponding to the SFN pulse and modified by a timing adjustment parameter, resulting in the buffered data proceeding from the buffer to a signal egress point of the radio unit equipment. The buffer can additionally determine the timing adjustment parameter based on a defined signal propagation delay between the buffer and the signal egress point of the radio unit equipment.

In another implementation, a system is described herein. The system can include a processor and a memory that stores executable instructions that, when executed by the processor, facilitate performance of operations. The operations can include transmitting a downlink test signal to a radio unit via a fronthaul connection of the radio unit, the downlink test signal having a defined frame start boundary; buffering the downlink test signal at the radio unit, resulting in buffered data; in response to an SFN pulse being observed at the radio unit, releasing the buffered data to an antenna port of the radio unit; and computing a downlink time delay associated with the radio unit as a difference between a first time, corresponding to the SFN pulse, and a second time, corresponding to the defined frame start boundary of the downlink test signal being observed at the antenna port of the radio unit.

In an additional implementation, another system is described herein. The system can include a processor and a memory that stores executable instructions that, when executed by the processor, facilitate performance of operations. The operations can include transmitting an uplink test signal to an antenna port of a radio unit, the uplink test signal having a defined frame start boundary; buffering the uplink test signal at the radio unit, resulting in buffered data; converting the uplink test signal to a baseband input signal; and determining an uplink time delay associated with the radio unit based on a result of cross correlating the baseband input signal with the buffered data.

DESCRIPTION OF DRAWINGS

Various non-limiting embodiments of the subject disclosure are described with reference to the following figures, wherein like reference numerals refer to like parts throughout unless otherwise specified.

FIG. 4 is a flow diagram of an example process for achieving downlink time alignment in radio unit operation in accordance with various implementations described here.

FIG. 6 is a flow diagram of an example process for achieving uplink time alignment in radio unit operation in accordance with various implementations described here.

FIGS. 8-9 are flow diagrams of example processes that can be performed by the system of FIG. 7 for downlink and uplink delay characterization, respectively, in accordance with various implementations described here.

DETAILED DESCRIPTION

Figure 1:
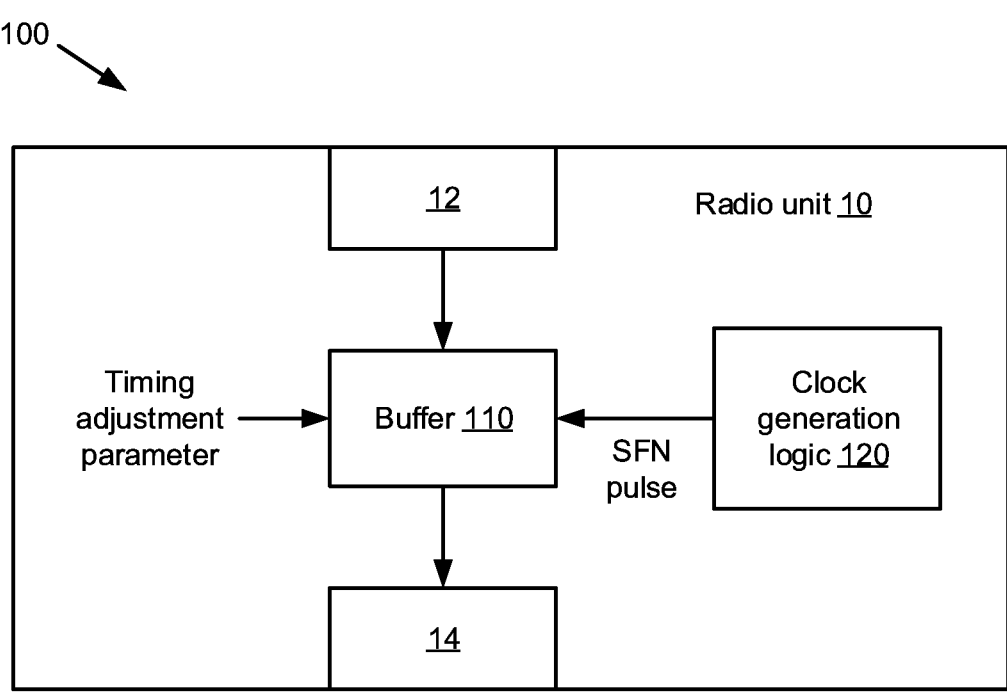
FIG. 1 is a block diagram of a system that facilitates radio unit time alignment and delay characterization in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein facilitate time alignment and delay characterization for a radio unit (RU), such as an Open Radio Unit (O-RU) operating in an Open Radio Access Network (O-RAN) architecture. While various examples provided herein relate specifically to O-RAN architectures, it is noted that these examples are provided merely for descriptive purposes and are not intended to limit the description or claimed subject matter to any particular technology, or combination of technologies, unless explicitly stated otherwise.

In the example of O-RAN operation, accurately determining RU latency can be challenging due to the use of ethernet packet data by an Enhanced Common Public Radio Interface (eCPRI), e.g., that provides fronthaul connectivity between an RU and a Distributed Unit (DU) and/or other devices, as such data can have variable latency due to the variability of fronthaul connectivity. Additionally, ethernet packet data is represented in the frequency domain, which can further contribute to the challenge in accurately characterizing latency.

Additionally, network devices, such as an O-RU or the like, can be associated with network standards that impose limits on time alignment error (TAE) and/or other timing properties. For instance, the Third Generation Partnership Project (3GPP) standards limit an acceptable relative TAE for multiple-input multiple-output (MIMO) and transmit diversity to 65 ns in either direction and an acceptable relative TAE for carrier aggregation to 260 ns in either direction. Other network standards, such as the O-RAN standard, also provide similar timing specifications. Furthermore, Ultra-Reliable-Low-Latency-Communication (URLLC) applications, such as those in an O-RAN Private Fifth Generation (P5G) network, can provide additional use cases that benefit from low and accurate latency designs.

As a result of the above, both low latency radio unit design and accurate timing characterization methodologies are desirable for optimal system performance and user experience. By way of example, timing issues and/or poor TAE can result in user equipment (UE) attachment failure, reduced throughput, and/or other degradations to network performance.

To the furtherance of these and/or related ends, various implementations herein provide radio unit timing models for both downlink and uplink communication. As used herein, "downlink" refers to communications to a radio unit, e.g., from a distributed unit or other devices, while "uplink" refers to communications from a radio unit, e.g., to a distributed unit or the like. In contrast to approaches that involve complex delay models with multiple functional blocks that are prone to error, implementations described herein implement a buffer design for downlink and uplink communication that is triggered by a Synchronized Frame Number (SFN) pulse, which is in turn synchronized with a system grand master clock through Precision Time Protocol (PTP). As a result, in the downlink, only the time error (TE) after the buffer (e.g., as will be shown in FIG. 3) contributes to the downlink end-to-end TE. In the uplink, only the TE before the buffer (e.g., as will be shown in FIG. 5) contributes to the uplink end-to-end TE. As a result, the use of simpler timing models can be enabled. Additionally, various implementations herein provide a radio unit delay characterization apparatus that can leverage timing models as noted above to implement accurate and reliable methodologies to characterize downlink/uplink delay. As a result of the aforementioned buffer design and downlink/uplink delay characterization techniques, time alignment among antennas of an RU can be made independent of fronthaul delay. Other advantages of the implementations described herein are also possible.

With reference now to the drawings, FIG. 1 illustrates a block diagram of a system 100 that facilitates radio unit time alignment and delay characterization in accordance with various implementations described herein. System 100 as shown in FIG. 1 includes a radio unit 10, also referred to herein as radio unit equipment, that can be utilized to facilitate wireless communication in a wireless communication network. In an implementation in which the radio unit 10 operates in an O-RAN network, the radio unit 10 can also be referred to as an O-RU. Other naming conventions can also be used.

The radio unit 10 shown in FIG. 1 includes a buffer 110 that can store input data received via a signal ingress point 12 of the radio unit 10. As used herein, data held by the buffer 110 in this manner is referred to as buffered data. In various implementations, the buffer 110 can include data storage devices, controller devices, and/or any other suitable physical components that enable the buffer 110 to conditionally store input data. While not shown in FIG. 1, the buffer 110 could also be controlled via a separate control unit that includes associated hardware and/or software components for controlling operation of the buffer 110.

The radio unit 10 shown in FIG. 1 further includes clock generation logic 120 that can provide, among other signals or other information, an SFN pulse to the buffer 110. Based on the SFN pulse, the buffer 110 can be configured to release its buffered data at a time corresponding to the SFN pulse and modified by a timing adjustment parameter. Stated another way, the buffer 110 can apply a time delay or timing advance to the SFN pulse based on the timing adjustment parameter, resulting in a modified time, and release buffered data at the modified time. The buffered data, once released from the buffer 110, can then proceed from the buffer 110 to a signal egress point 14 of the radio unit 10.

The clock generation logic 120 can be implemented in hardware, e.g., via an oscillator or other hardware components, in software, or as a combination of hardware and software. For a software-based implementation, the clock generation logic can operate based on instructions stored in a memory or other data store associated with the radio unit 10 and executed by a processor. Other implementations could also be used.

In various implementations, the identity of the signal ingress point 12 and signal egress point 14 can vary depending on whether the radio unit 10 is engaged in downlink or uplink communication. For the example of downlink communication, the signal ingress point 12 can be an eCPRI or other interface that facilitates fronthaul communication with other network devices (e.g., a distributed unit) over a fiber connection or other suitable fronthaul communication medium, and the signal egress point 14 can be an antenna port that facilitates over-the-air data communication to UEs and/or other suitable devices. Conversely, for uplink communication, the signal ingress point 12 can be an antenna port and the signal egress point 14 can be a fronthaul interface, e.g., as described above for downlink communication. An example model for downlink communication in this manner is described in further detail below with respect to FIGS. 3-4, and an example model for uplink communication is described in further detail below with respect to FIGS. 5-6.

In downlink implementations, the buffer 110 can determine the timing adjustment parameter as noted above based on a defined signal propagation delay between the buffer 110 and the signal egress point 14 (e.g., an antenna port for downlink communication) of the radio unit 10. In uplink implementations, the buffer 110 can determine the timing adjustment parameter as noted above based on a defined signal propagation delay between the signal ingress point 12 (e.g., an antenna port for uplink communication) and the buffer 110 of the radio unit 10. For instance, the timing adjustment parameter can account for data processing that occurs between the buffer 110 and the signal egress point 14, such as time-frequency domain conversion or the like. In other implementations, the timing adjustment parameter can be provided to the buffer 110 via external control logic and/or other means. In still other implementations, the signal propagation delay utilized to determine the timing adjustment parameter can be determined in advance, e.g., as will be described below with respect to FIGS. 7-9, and stored in a database and/or another suitable data store at the radio unit 10.

Figure 2:
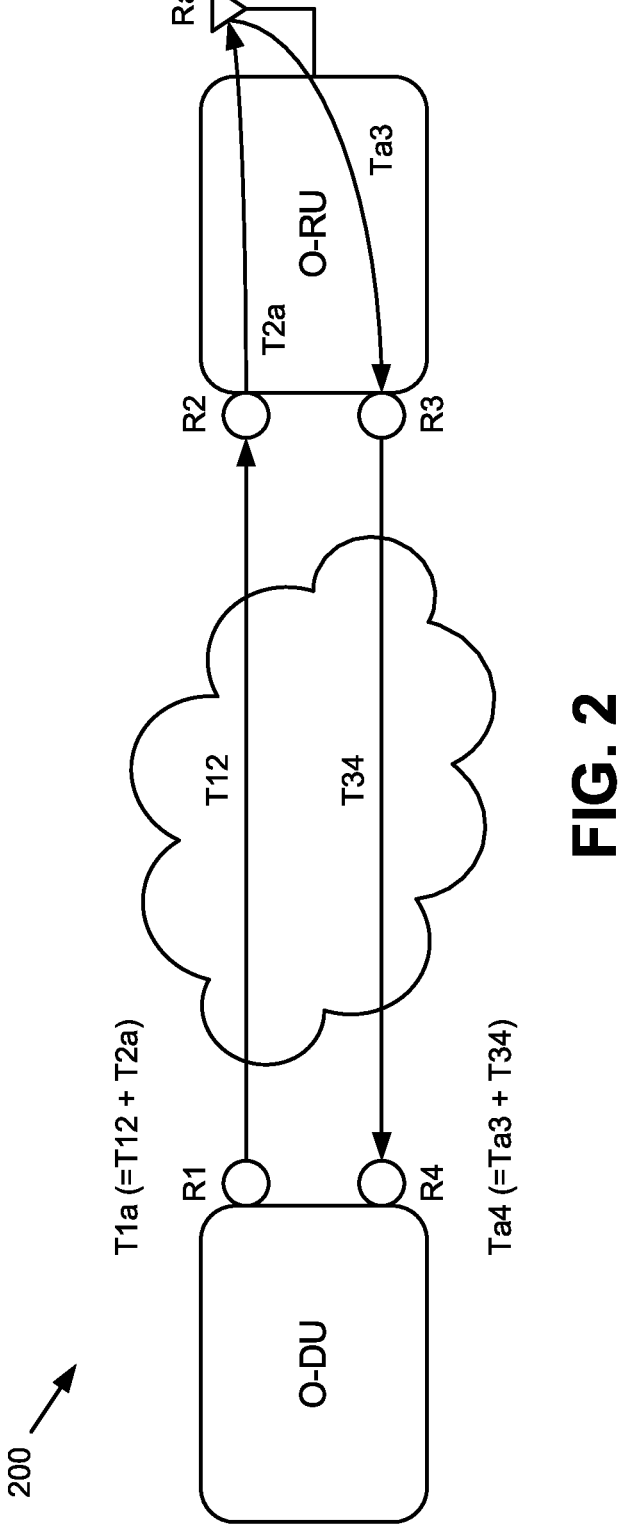
FIG. 2 is a diagram depicting an example Open Radio Access Network (O-RAN) delay model that can be utilized by various implementations described herein.

Referring now to FIG. 2, a diagram 200 depicting an example O-RAN delay model that can be utilized by various implementations described herein is illustrated. In particular, diagram 200 shows a delay model for communications between an Open Distributed Unit (O-DU) and an O-RU. Additionally, diagram 200 denotes the reference points R1-R4 defined for eCPRI, where R1 and R4 are the transmit and receive interfaces at the O-DU, respectively, and R2 and R3 are the receive and transmit interfaces at the O-RU, respectively. Additionally, the antenna interface at the O-RU is denoted in diagram 200 as Ra. It is noted that while diagram 200 illustrates an O-RAN delay model between an O-RU and an O-DU, similar concepts would also apply to other, non-O-RAN devices and networks.

Illustrated between the O-DU and O-RU in diagram 200 is a fronthaul connection (e.g., a fiber connection, a transport connection, etc.) that connects the O-DU and O-RU through reference points R1-R4. The downlink transport delay, e.g., the delay from reference point R1 to reference point R2, is denoted as T12, and the uplink transport delay, e.g., the delay from reference point R3 to reference point R4, is denoted as T34. Here, the delay parameters T12 and T34 are equivalent to the fronthaul delay between the O-DU and O-RU.

In some implementations, the DU can compute the values of T12 and T34 using techniques such as a defined transport method, a measured transport method, and/or other techniques generally known in the art. In addition, various implementations described herein provide simple timing models for the internal delay associated with the O-RU, e.g., delay parameters T2a and Ta3 as shown in diagram 200, and provide accurate and reliable characterization of those parameters in order for the O-DU to determine the total delay represented in diagram 200 by T1a and Ta4.

Accurate characterization of RU delay, e.g., T2a and Ta3, can be utilized by the network represented by diagram 200 to facilitate time alignment between the O-DU and O-RU. In an example, the O-DU and O-RU can each structure communications into radio frames of a given time length (e.g., 10 ms) that utilize a common clock as a reference. This common clock can be provided to the O-RU by the O-DU, or alternatively a local clock can be utilized at the O-RU. In addition, the system can maintain a master clock signal, referred to as a grand master clock, that generates an SFN pulse at regular intervals (e.g., every 10 ms) that is aligned to the radio frames.

Based on the above framework, communications can be structured such that data is configured to arrive at the antenna port of the O-RU concurrently with the SFN pulse. Accordingly, the O-DU can be configured to send downlink data to the O-RU at an advance equal to the total downlink delay, e.g., T1a as shown in diagram 200, such that data arrives at the antenna port of the O-RU at the SFN pulse. For uplink communication, the O-DU can utilize the total uplink delay, e.g., Ta4 as shown in diagram 200, to determine a time at which uplink data, originating from the antenna port of the O-RU at the SFN pulse, can be received. As T12 and T34 are fixed parameters based on the properties of the fiber connection between the O-DU and O-RU, knowledge of the RU-side delay parameters T2a and Ta3 at the O-DU is advantageous to avoid excessive time alignment error.

In some implementations, the RU delay parameters T2a and Ta3 can be dependent on the design of the RU. Additionally, the RU delay parameters can be based on a carrier bandwidth used by the RU, as different bandwidths (e.g., 10 MHZ 20 MHZ, 40 MHZ, etc.) could have different values even on the same device. While various implementations are described herein with respect to a single carrier bandwidth, it is noted that the concepts described herein could also be applied to delay characterization for multiple carrier bandwidths without departing from the scope of this description or the claimed subject matter.

Figure 3:
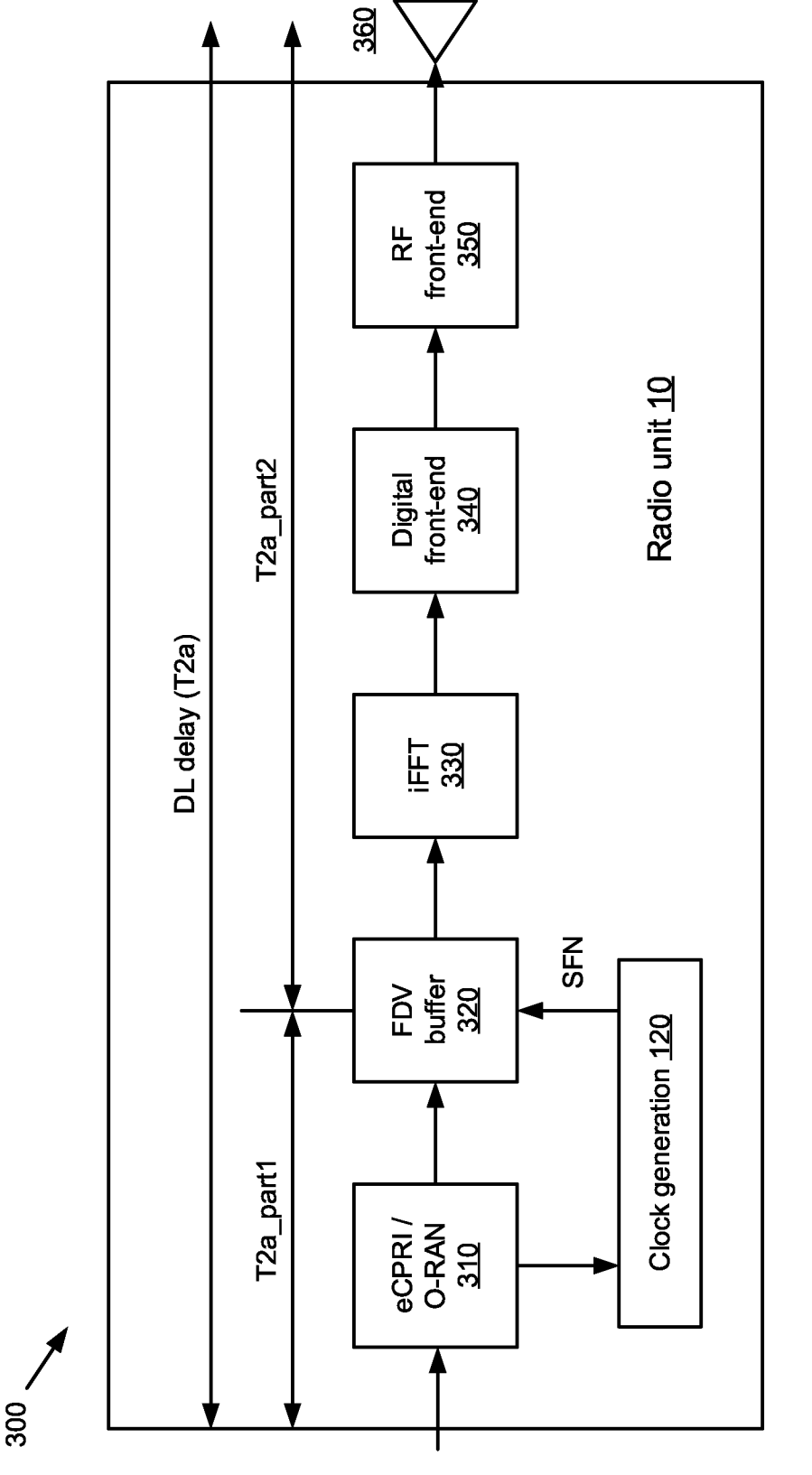
FIG. 3 is a block diagram of a radio unit downlink timing model that can be utilized in accordance with various implementations described herein.

Turning now to FIG. 3, a block diagram of a radio unit downlink (DL) timing model 300, referred to herein as simply "model 300," that can be utilized in accordance with various implementations described herein. Repetitive description of like parts described above with regard to other implementations is omitted for brevity. Model 300 as shown in FIG. 3 represents a downlink signal path for a radio unit 10. With reference to the simplified radio unit 10 shown in FIG. 1, the signal ingress point 12 of the radio unit 10 shown in FIG. 3 is an interface for a fronthaul connection to a distributed unit, e.g., an eCPRI/O-RAN interface 310, the buffer 110 of the radio unit 10 shown in FIG. 3 corresponds to a frame delay variation (FDV) buffer 320, and the signal egress point 14 of the radio unit 10 shown in FIG. 3 is an antenna port 360.

The radio unit 10 shown in FIG. 3 includes additional processing blocks, such as domain conversion logic (here, inverse fast Fourier transform (iFFT) logic 330) that can convert frequency domain data received via the eCPRI/O-RAN interface 310 and buffered by the FDV buffer 320 to time domain data. The radio unit 10 further includes digital front-end logic 340 and radio frequency (RF) front-end logic 350 that can perform respective operations to convert incoming downlink data to a format that can be transmitted via the antenna port 360. The blocks 310-350 shown in model 300 can be implemented in hardware, software, or a combination of hardware and software, e.g., as appropriate for a given implementation of the radio unit 10.

As shown in model 300, the delay parameter T2a of the radio unit 10 (e.g., as described above with respect to FIG. 2) can be divided into two parts, referred to here as T2a_part1 and T2a_part2, that are divided by the FDV buffer 320. Operation of the FDV buffer 320 can be triggered based on an SFN pulse, e.g., provided by clock generation logic 120 as described above with respect to FIG. 1 and/or via other sources, which can result in only T2a_part2 contributing to the total downlink delay of the radio unit 10.

With further reference to method 400 in FIG. 4, example operations that can be performed to achieve downlink time alignment in actual operation are described in further detail. At 402, the clock generation logic 120 can be synchronized with a grand master clock signal, e.g., as provided by a distributed unit via the eCPRI/O-RAN interface 310 and/or by other sources, via PTP and/or other suitable protocols. Based on this synchronization, the clock generation logic 120 can generate an SFN pulse, which can also be synchronized with the system grand master through PTP or the like.

Next, at 404, the SFN pulse generated via the clock generation logic at 402 can be used to trigger the FDV buffer 320 and/or another suitable downlink buffer. In model 300, the delay T2a_part1 prior to the FDV buffer 320 does not contribute to the end-to-end TAE since the FDV buffer 320 can accurately control the time to read out data. For instance, a distributed unit communicatively coupled to the radio unit 10 via the eCPRI/O-RAN interface 310 can provide downlink data with a rough time advance relative to the SFN pulse that is larger than the advance utilized by the FDV buffer 320. In such an example, the FDV buffer 320 can hold the incoming data based on a local, smaller frame advance, thereby excluding T2a_part1 as a contributor to the total delay. As a result, the total delay of the radio unit 10 from the perspective of the FDV buffer 320 can be equivalent to T2a_part2, which can be a constant value due to data leaving the FDV buffer 320 being converted to the time domain via the iFFT block 330, removing the uncertainty in T2a_part1 associated with frequency domain data.

As a result of the above, at 406, the FDV buffer 320 can start to read out downlink data at a time determined by advancing the time of the SFN pulse by a timing adjustment parameter equal to T2a_part2. At 408, the downlink data can reach the antenna port 360 simultaneously with, substantially concurrently to, a time at which the SFN pulse arrives at the radio unit 10, e.g., as a result of the advance applied by the FDV buffer 320 at 406. As used herein, "substantially concurrently" refers to events that occur within a defined interval of time (e.g., as specified via a tolerance) of each other.

In an implementation in which the radio unit 10 includes multiple antennas, similar procedures to those described with respect to method 400 can be applied, thereby achieving time alignment among multiple antennas. An example of a downlink signal path for a radio unit 10 with multiple antennas is described below with respect to FIG. 10.

Figure 5:
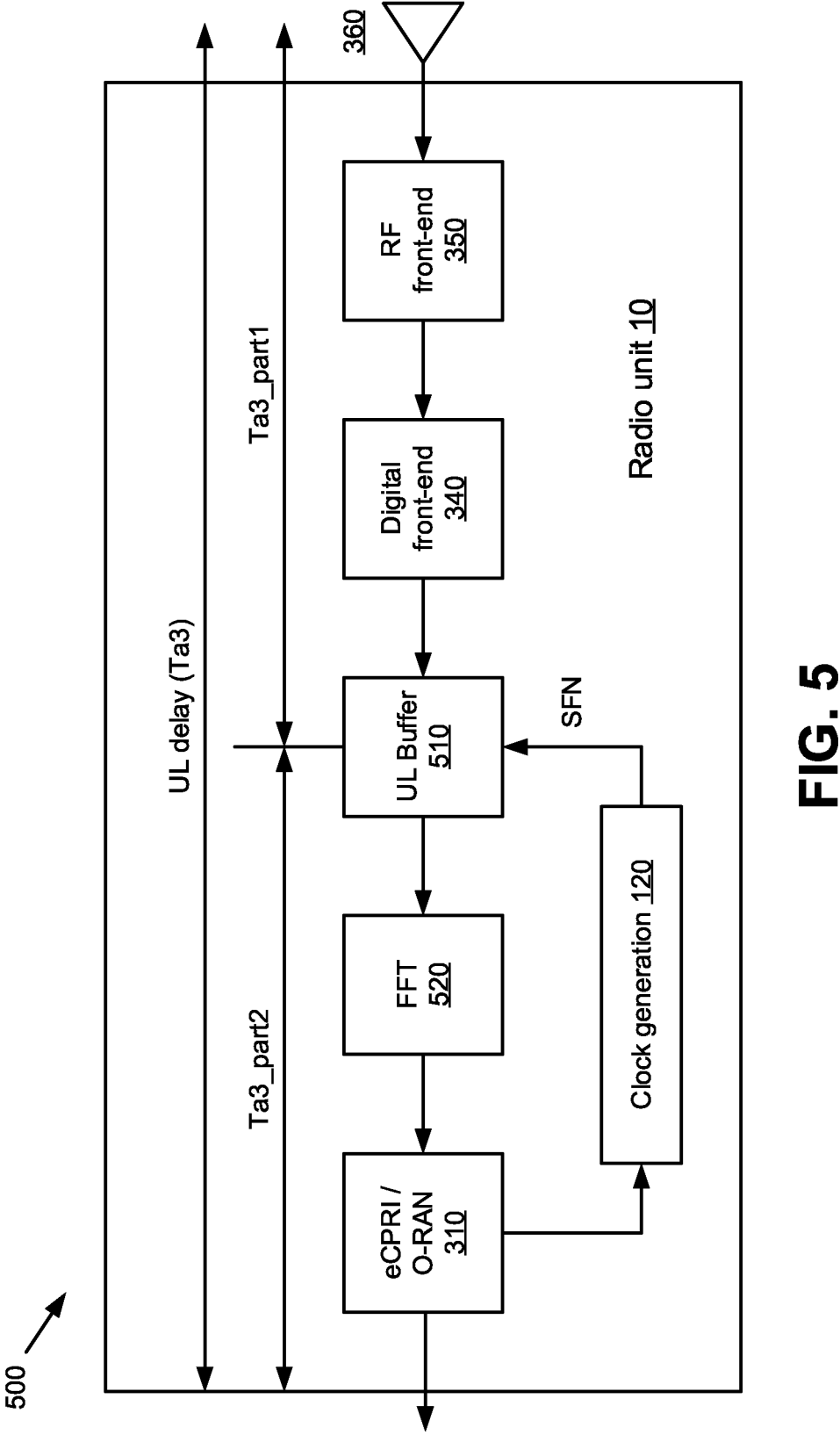
FIG. 5 is a block diagram of a radio unit uplink timing model that can be utilized in accordance with various implementations described herein.

Referring now to FIG. 5, a block diagram of a radio unit uplink (UL) timing model 500, referred to herein as simply "model 500," that can be utilized in accordance with various implementations described herein. Repetitive description of like parts described above with regard to other implementations is omitted for brevity. Model 500 as shown in FIG. 5 represents an uplink signal path for a radio unit 10. With reference to the simplified radio unit 10 shown in FIG. 1, the signal ingress point 12 of the radio unit 10 shown in FIG. 5 is the antenna port 360, the buffer 110 of the radio unit 10 shown in FIG. 5 corresponds to an uplink buffer 510, and the signal egress point 14 of the radio unit is the fronthaul connection, e.g., implemented via the eCPRI/O-RAN interface 310.

Similar to the radio unit 10 shown in FIG. 3, the radio unit 10 shown in FIG. 5 includes additional processing blocks, such as domain conversion logic (here, fast Fourier transform (FFT) logic 520) that can convert time domain data received via the antenna port 360 and buffered by the uplink buffer 510 to frequency domain data, digital front-end logic 340, and radio frequency (RF) front-end logic 350. The blocks 310, 340, 350, 510, 520 shown in model 500 can be implemented in hardware, software, or a combination of hardware and software, e.g., as appropriate for a given implementation of the radio unit 10.

Similar to model 300 in FIG. 3, the delay parameter Ta3 of the radio unit 10 shown in model 500 can be divided into two parts, referred to here as Ta3_part1 and Ta3_part2, that are divided by the uplink buffer 510. Operation of the uplink buffer 510 can be triggered based on an SFN pulse, e.g., provided by clock generation logic 120 as described above with respect to FIG. 1 and/or via other sources, which can result in only Ta3_part1 contributing to the total uplink delay of the radio unit 10.

With further reference to method 600 in FIG. 6, example operations that can be performed to achieve uplink time alignment in actual operation are described in further detail. Method 600 can begin at 602 with synchronization of the clock generation logic 120 and SFN pulse generation, which can be done in a similar manner to that described above at 402 of method 400.

Next, at 604, the SFN pulse generated via the clock generation logic at 602 can be used to trigger the uplink buffer 510. At 606, the buffer can timestamp buffered uplink data (e.g., corresponding to a frame start S0) with a delay parameter equal to Ta3_part1 after the SFN pulse arrives. This results in the uplink buffer 510 effectively releasing buffered uplink data at a delay relative to the SFN pulse by a timing adjustment parameter that is equal to Ta3_part1.

In some implementations, method 600 can conclude at 608, in which the delay parameter associated with the uplink data (e.g., Ta3_part1) is indicated to a distributed unit and/or other network equipment at 608. This can be performed by, e.g., the eCPRI/O-RAN interface 310 of the radio unit 10 and/or other suitable components operating as delay notification logic for the radio unit 10.

In model 500, the delay Ta3_part2 following the uplink buffer 510 does not contribute to the end-to-end TAE since the frame start time is established in the uplink buffer 510 and the FFT logic 520. As a result, the total delay of the radio unit 10 from the perspective of the uplink buffer 510 can be equivalent to Ta3_part1, which can be a constant value due to data entering the uplink buffer 510 being time domain data, removing the uncertainty in Ta3_part2 associated with converting said time domain data to the frequency domain.

In an implementation in which the radio unit 10 includes multiple antennas, similar procedures to those described with respect to method 600 can be applied, thereby achieving time alignment among multiple antennas. An example of an uplink signal path for a radio unit 10 with multiple antennas is described below with respect to FIG. 11.

Figure 7:
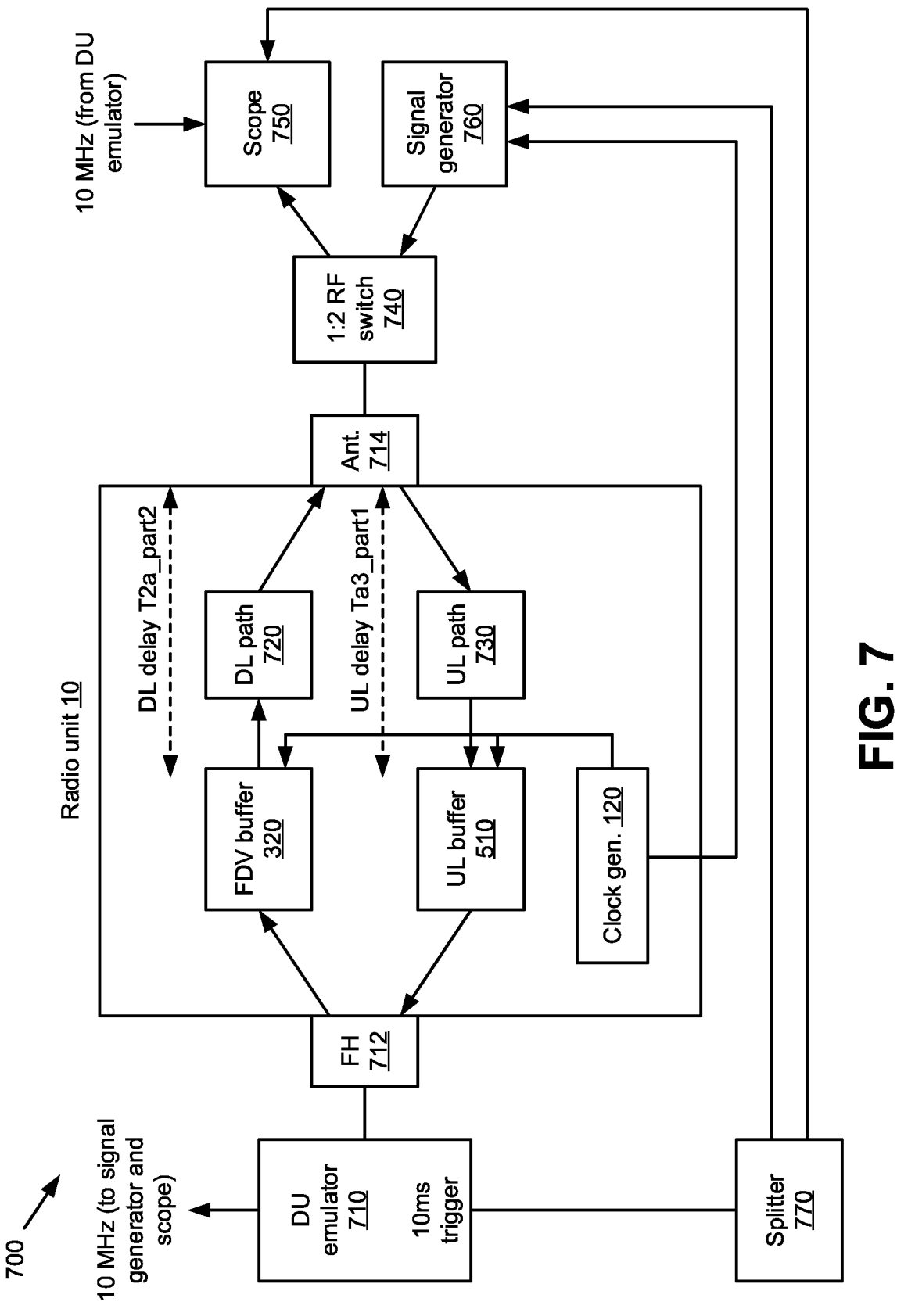
FIG. 7 is a block diagram of a system that facilitates radio unit delay characterization in accordance with various implementations described herein.

Referring now to FIG. 7, a block diagram of a system 700 that facilitates radio unit delay characterization in accordance with various implementations described herein is illustrated. Repetitive description of like parts described above with regard to other implementations is omitted for brevity. System 700 as shown in FIG. 7 includes a DU emulator 710, which can be composed of appropriate hardware and/or software elements to mimic various operations performed by distributed equipment.

The DU emulator 710 is connected to a radio unit 10 via a fronthaul (FH) interface 712. The radio unit 10 shown in system 700 includes an FDV buffer 320 and an uplink buffer 510, which can operate as described above with respect to FIG. 3 and FIG. 5, respectively. The radio unit 10 also includes a downlink path 720 and an uplink path 730, which can operate in a similar manner to the blocks described above with respect to FIG. 3 and FIG. 5, respectively, and are illustrated in FIG. 7 as single blocks for simplicity. The DL path 720 and uplink path 730 are communicatively coupled to an antenna 714 of the radio unit 10.

As further shown in FIG. 7, an RF switch 740 selectively couples the antenna 714 of the radio unit 10 to a scope 750 and/or a signal generator 760 based on whether the radio unit 10 is operating in the uplink or downlink. For instance, the RF switch 740 in downlink mode can connect the antenna 714 of the radio unit 10 to the scope 750, and in uplink mode the RF switch 740 can connect the signal generator 760 to the antenna 714. Clock generation logic 120 of the radio unit 10 can provide a SFN pulse to the buffers 320, 510 and the signal generator 760, e.g., as generally described above. Additionally, a splitter 770 is connected to the DU emulator 710, scope 750, and signal generator 760 to facilitate provisioning of signals within system 700.

The DU emulator 710 can provide a reference signal corresponding to a carrier frequency, e.g., a 10 MHz reference signal or another suitable frequency, which can be aligned to the scope 750 and the signal generator 760 in time. Additionally, the DU emulator 710 can generate a 10 ms trigger signal, which can function as a SFN pulse that is supplied to the scope 750 and signal generator 760 via the splitter 770 to facilitate switching between uplink and downlink operation. It is noted that the SFN pulse generated via the DU emulator 710 and the SFN pulse generated by the clock generation logic 120 can be independently generated.

In the implementation shown in FIG. 7, the RF switch 740, scope 750, signal generator 760, and/or splitter 770 can be external equipment, i.e., equipment that is not part of the radio unit 10. Any associated delays associated with these external components and/or connections therebetween (e.g., via cables or the like) can be calibrated and subtracted from the final overall delay.

In some implementations, system 700 can be utilized in the development process of the radio unit 10 to determine the timing parameters (e.g., T2*a*_part2 and Ta3_part1) associated with the radio unit 10. Once these timing parameters are determined, they can be stored in a database or other data store of the radio unit 10 (not shown in FIG. 7) and used by software associated with the radio unit 10. As these parameters do not change during operation of the radio unit 10 for a given carrier bandwidth, they can be stored and utilized at the radio unit 10 once determined.

Turning to FIGS. 8-9, and with further reference to FIG. 7, respective methods 800, 900 that can be performed by system 700 are illustrated. In an implementation, the operations described in methods 800 and 900 can be performed via software, e.g., by a processor executing instructions stored on a memory which, when executed by the processor, cause the processor to perform the listed operations. A processor and memory used in this manner can be associated with the radio unit 10 itself, or alternatively an external orchestration device (not shown in FIG. 7) could be used. An example of a computer architecture that can be utilized to facilitate the operations shown in FIGS. 8-9 is described in further detail below with respect to FIG. 12. It is noted that methods 800 and 900 are automated in this manner due to the amount and frequency of associated data (e.g., on the order of millions of data points per second), as well as the operations to be performed on said data not being capable of being performed by a human with the precision necessary for proper operation of the radio unit 10 (e.g., on the order of nanosecond-level precision) in a useful or reasonable timeframe.

Referring first to FIG. 8, an example method 800 for downlink operation of system 700 begins at 802, in which a downlink test signal, also referred to as a test vector, can be transmitted to the radio unit 10 (e.g., from the DU emulator 710) via the fronthaul interface 712 of the radio unit 10. For instance, a test pattern with a defined frame start boundary S0 can be created and loaded into the DU emulator 710 for transmittal to the radio unit 10. Unlike typical distributed unit operation in which data is provided to the radio unit with an advance, a transmission advance of the DU emulator 710 at 802 can be set to zero in order to remove the impact of an advance applied by the DU emulator 710 on the resulting delay of the radio unit 10.

Next, at 804, the radio unit 10 is activated, and the downlink test signal transmitted by the DU emulator 710 at 802 can be buffered by the radio unit 10, e.g., via the FDV buffer 320, resulting in buffered data. At 806, the buffered data is released to the antenna 714 of the radio unit 10, e.g., via the downlink path 720, in response to an SFN pulse generated by the clock generation logic 120 being observed at the radio unit 10.

Data released by the FDV buffer 320 at 806 can then be conveyed via the antenna 714 to the scope 750 at 808, where the data is captured by the scope 750 and a downlink time delay associated with the radio unit 10 can be computed as a difference between a first time, corresponding to the time of the SFN pulse associated with the clock generation logic 120 and/or the trigger signal produced by the DU emulator 710, and a second time, corresponding to the frame start boundary S0 of the test signal being observed at the antenna 714 of the radio unit. Stated another way, the downlink delay of the radio unit 10, e.g., T2*a*_part2, can be determined at 808 as the delay from the SFN pulse to the frame start S0 as observed via the scope 750.

Turning next to FIG. 9, an example method 900 for downlink operation of system 700 begins at 902, in which an uplink test signal (e.g., a test vector) with a known frame start boundary S0 can be loaded into the signal generator 760, from which the uplink test signal can be transmitted from the signal generator to the radio unit 10 via the antenna 714. In some implementations, the uplink test signal used by method 900 can be the same signal, or a similar signal, to the downlink test signal used by method 800 as described above.

Next, at 904, the radio unit 10 is activated, and the uplink test signal transmitted at 902 can be buffered by the radio unit 10, e.g., via the uplink buffer 510, resulting in buffered data. At 906, the uplink test signal provided via the signal generator 760 can be converted to a baseband input signal, e.g., either in parallel with or in response to the buffering performed at 904.

At 908, method 900 can conclude by determining an uplink time delay associated with the radio unit 10 based on a result of cross correlating the baseband input signal generated at 906 with the buffered data produced at 904. By way of example, one or more digital signal processing techniques can be utilized at 908 to determine a sliding distance (e.g., from the buffered data to the baseband input signal) that results in at least a threshold amount of correlation between the baseband input signal and the buffered data.

While both method 800 and method 900 illustrate operations that can be performed by system 700 to determine radio unit delay parameters for a single carrier frequency (e.g., 10 MHZ), similar operations could be performed to determine delay parameters for the radio unit 10 at different carrier frequencies. For instance, each of the operations shown in method 800 (for downlink delay) and/or method 900 (for uplink delay) could be repeated for additional test signals that are associated with different carrier bandwidths, e.g., a second test signal associated with a second carrier frequency (e.g., 20 MHz), a third test signal associated with a third carrier frequency (e.g., 40 MHZ), etc., resulting in additional time delay parameters associated with those additional carrier bandwidths.

As noted above, operation of system 700, e.g., as described above with respect to methods 800 and 900, can be performed during a development stage for the radio unit 10. Upon determining the timing parameters associated with the radio unit 10 as described above, those parameters can be stored at the radio unit 10, e.g., in a database or other data store associated with the radio unit, and/or otherwise stored at a location accessible by the radio unit 10, e.g., a remote device that is communicatively coupled to the radio unit 10 via the fronthaul interface 712 and/or antenna 714.

In some implementations, the accuracy of the timing parameters associated with the radio unit 10 can be verified during a conformance test, e.g., a 3GPP TAE test, an end-to-end data throughput test, and/or other suitable tests. During this stage, tuning can be performed to improve throughput and facilitate conformity to 3GPP TAE specifications. Once finalized, however, the timing parameters of the radio unit 10 can be expected to remain substantially constant during deployment in the field.

Figure 10:
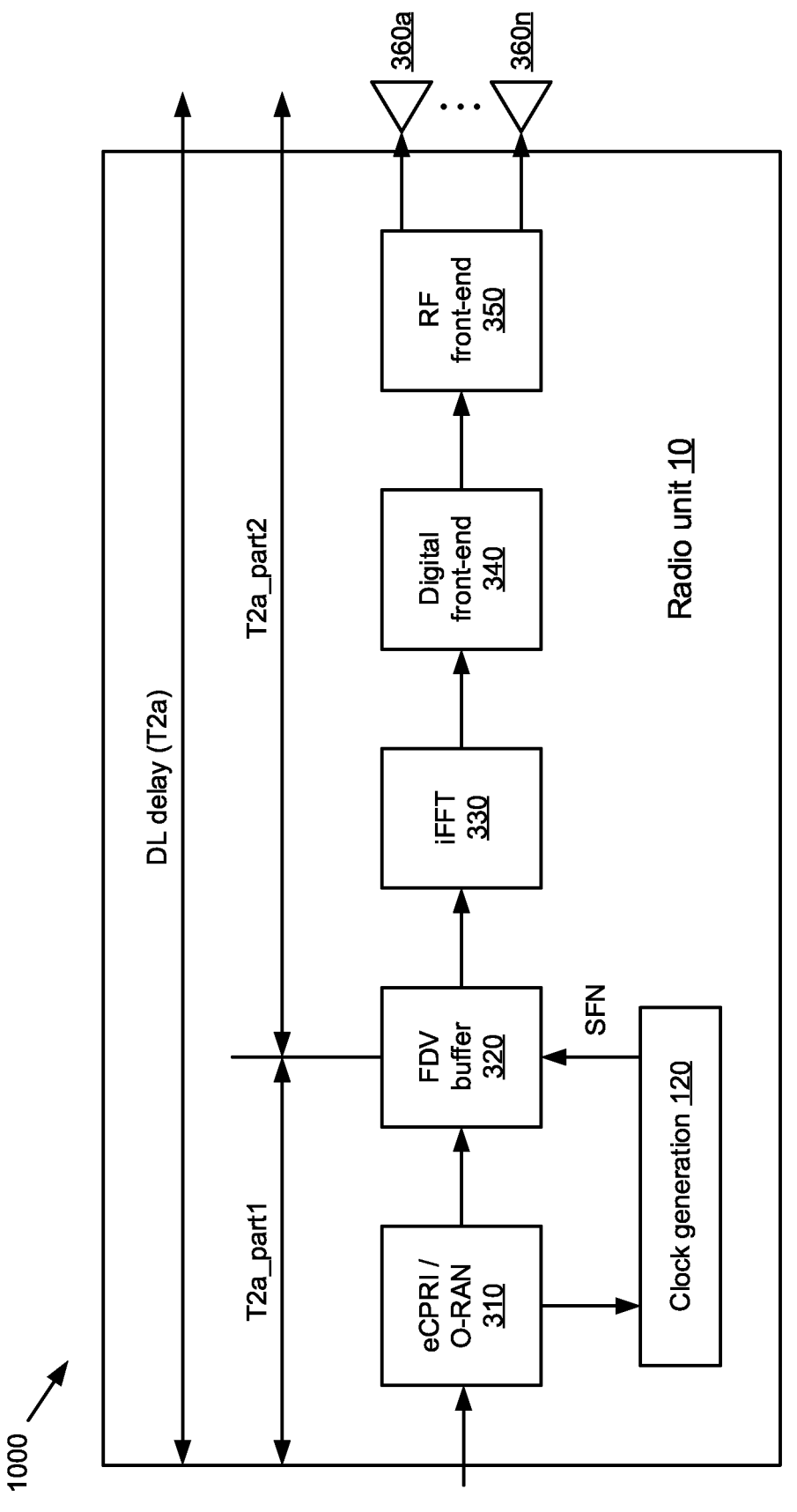
FIG. 10 is a block diagram of a downlink timing model that can be utilized by a radio unit with multiple antenna ports in accordance with various implementations described herein.

Referring next to FIG. 10, a block diagram of a downlink timing model 1000 that can be utilized by a radio unit 10 with multiple antenna ports 360a-360n in accordance with various implementations described herein is illustrated. Repetitive description of like parts described above with regard to other implementations is omitted for brevity. Model 1000 shown in FIG. 10 is similar to model 300 described above with respect to FIG. 3, with the addition of multiple antenna ports 360a-360n. It is noted that the naming convention utilized for the antenna ports 360a-360n is merely for purposes of illustration and is not intended to imply a specific number of antenna ports.

As noted above with respect to FIG. 3, the FDV buffer 320 can be designed such that it is triggered by an SFN pulse and reads out data in advance of the SFN. This advance amount can be equivalent to T2a_part2, which can be characterized as described above with respect to FIGS. 7-8. Use of this advance can ensure that downlink data arrives at the antenna ports 360a-360n when the SFN pulse arrives at the radio unit 10. The same procedures can be applied to each of the antenna ports 360a-360n, which can ensure that downlink data at all antenna ports 360a-360n is synchronized and meets 3GPP TAE requirements. In this manner, fronthaul delay does not contribute to the TAE for any of the antenna ports 360a-360n.

Figure 11:
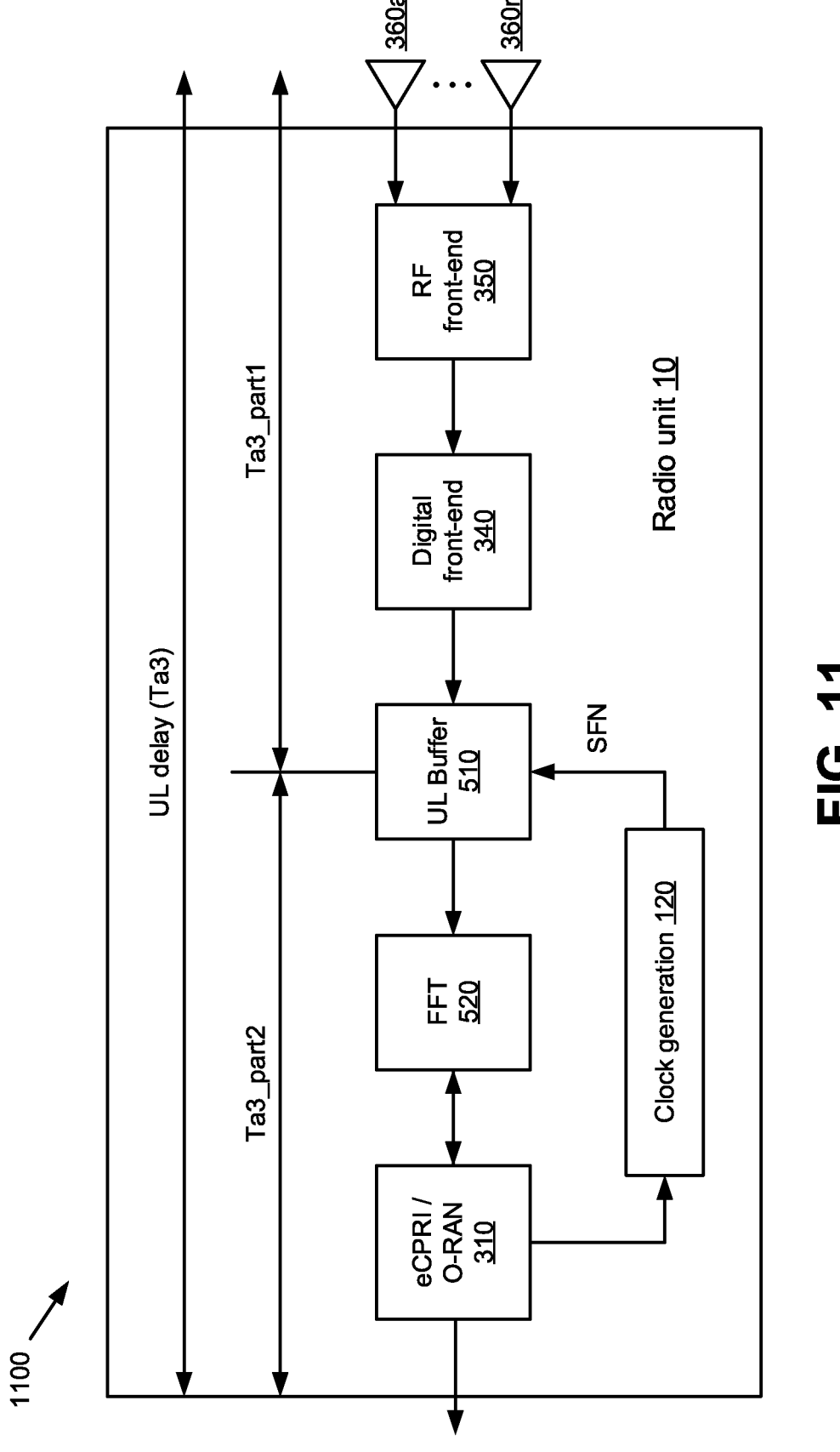
FIG. 11 is a block diagram of an uplink timing model that can be utilized by a radio unit with multiple antenna ports in accordance with various implementations described herein.

Turning to FIG. 11, a block diagram of an uplink timing model that can be utilized by a radio unit 10 with multiple antenna ports 360a-360n in accordance with various implementations described herein is illustrated. Repetitive description of like parts described above with regard to other implementations is omitted for brevity. Similar to model 1000, model 1100 shown in FIG. 11 is similar to model 500 above with respect to FIG. 5 with the addition of multiple antenna ports 360a-360n.

For uplink operation as shown in FIG. 11, the same SFN pulse from the clock generation logic 120 can be used to trigger the uplink buffer 510. The buffer 510 can then read out uplink data (e.g., corresponding to a frame start S0) with a delay equal to Ta3_part1 (e.g., as characterized as described above with respect to FIGS. 7 and 9) after the SFN pulse arrives. The same procedures can be applied to each of the antenna ports 360a-360n, which can ensure that uplink data to the distributed unit from all antenna ports 360a-360n is synchronized and meets 3GPP TAE requirements. In this manner, fronthaul delay does not contribute to the TAE for any of the antenna ports 360a-360n.

FIGS. 4, 6, 8, and 9 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 12:
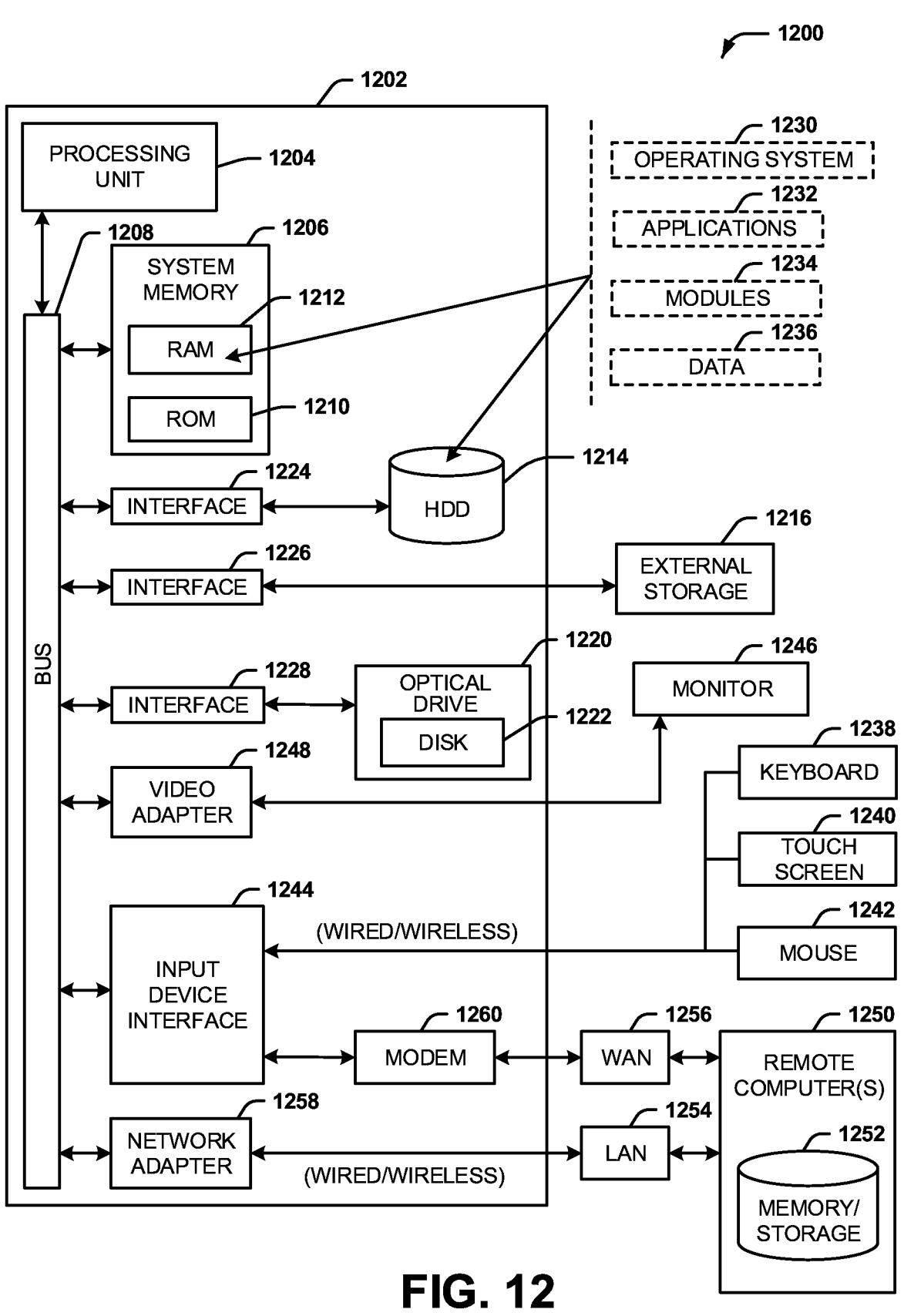
FIG. 12 is a diagram of an example computing environment in which various implementations described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. Radio unit equipment, comprising:
a buffer that stores input data received via a signal ingress point of the radio unit equipment, resulting in buffered data; and
clock generation logic that provides a synchronized frame number (SFN) pulse to the buffer, wherein the buffer releases the buffered data at a time corresponding to the SFN pulse and modified by a timing adjustment parameter, resulting in the buffered data proceeding from the buffer to a signal egress point of the radio unit equipment, wherein the buffer determines the timing adjustment parameter based on a defined signal propagation delay between the buffer and the signal egress point of the radio unit equipment, and wherein the timing adjustment parameter is based on a carrier bandwidth utilized by the radio unit equipment.

2. The radio unit equipment of claim 1, wherein the input data is associated with a downlink data signal, wherein the signal ingress point of the radio unit equipment comprises a fronthaul connection from the radio unit equipment to distributed unit equipment, and wherein the signal egress point of the radio unit equipment comprises an antenna port of the radio unit equipment.

3. The radio unit equipment of claim 2, wherein the buffered data comprises frequency domain data, and wherein the radio unit equipment further comprises:
domain conversion logic that converts the buffered data to time domain data in response to the buffer releasing the buffered data.

4. The radio unit equipment of claim 2, wherein the buffer advances the time corresponding to the SFN pulse by the timing adjustment parameter, resulting in the buffered data reaching the antenna port of the radio unit equipment substantially simultaneously to or concurrently with the SFN pulse.

5. The radio unit equipment of claim 4, wherein the signal egress point of the radio unit equipment comprises antenna ports, comprising the antenna port, and wherein the buffer releases the buffered data at the time as advanced by the buffer by the timing adjustment parameter, resulting in the buffered data reaching respective ones of the antenna ports substantially simultaneously to the SFN pulse.

6. The radio unit equipment of claim 1, wherein the input data is associated with an uplink data signal, wherein the signal ingress point of the radio unit equipment comprises an antenna port of the radio unit equipment, and wherein the signal egress point of the radio unit equipment comprises a fronthaul connection from the radio unit equipment to distributed unit equipment.

7. The radio unit equipment of claim 6, wherein the buffered data comprises time domain data, and wherein the radio unit equipment further comprises:
domain conversion logic that converts the buffered data to frequency domain data in response to the buffer releasing the buffered data.

8. The radio unit equipment of claim 6, wherein the input data is received by the antenna port of the radio unit equipment in response to the SEN pulse, and wherein the buffer delays the time corresponding to the SEN pulse by the timing adjustment parameter.

9. The radio unit equipment of claim 8, wherein the signal ingress point of the radio unit equipment comprises a plurality of antenna ports, comprising the antenna port, and wherein the buffer releases the buffered data at the time as delayed by the buffer by the timing adjustment parameter.

10. The radio unit equipment of claim 6, further comprising:
delay notification logic that indicates the timing adjustment parameter to the distributed unit via the fronthaul connection.

11. The radio unit equipment of claim 1, wherein the clock generation logic synchronizes the SFN pulse with a clock signal provided by distributed unit equipment communicatively coupled to the radio unit equipment.

12. A system, comprising:
a processor; and
a memory that stores executable instructions that, when executed by the processor, facilitate performance of operations, comprising:
transmitting a downlink test signal to a radio unit via a fronthaul connection of the radio unit, the downlink test signal having a defined frame start boundary;
buffering the downlink test signal at the radio unit, resulting in buffered data;
in response to a synchronized frame number (SFN) pulse being observed at the radio unit, releasing the buffered data to an antenna port of the radio unit; and
computing a downlink time delay associated with the radio unit as a difference between a first time, corresponding to the SEN pulse, and a second time, corresponding to the defined frame start boundary of the downlink test signal being observed at the antenna port of the radio unit.

13. The system of claim 12, wherein the transmitting of the downlink test signal comprises transmitting the downlink test signal from an emulated distributed unit to the radio unit via the fronthaul connection of the radio unit.

14. The system of claim 12, wherein the downlink test signal is a first downlink test signal associated with a first carrier bandwidth, the downlink time delay is a first downlink time delay associated with the first carrier bandwidth, and wherein the operations further comprise:
repeating the transmitting, buffering, releasing, and computing for a second downlink test signal associated with a second carrier bandwidth that is not the first carrier bandwidth, resulting in a second downlink time delay associated with the second carrier bandwidth.

15. The system of claim 12, wherein the operations further comprise:
storing the downlink time delay in a data store associated with the radio unit.

16. A system, comprising:
a processor; and
a memory that stores executable instructions that, when executed by the processor, facilitate performance of operations, comprising:
transmitting an uplink test signal to an antenna port of a radio unit, the uplink test signal having a defined frame start boundary;
buffering the uplink test signal at the radio unit, resulting in buffered data;
converting the uplink test signal to a baseband input signal; and determining an uplink time delay associated with the radio unit based on a result of cross correlating the baseband input signal with the buffered data.

17. The system of claim 16, wherein the determining comprises computing the uplink time delay associated with the radio unit based on a sliding distance from the buffered data to the baseband input signal that results in at least a threshold amount of correlation between the buffered data and the baseband input signal.

18. The system of claim 16, wherein the uplink test signal is a first uplink test signal associated with a first carrier bandwidth, the uplink time delay is a first uplink time delay associated with the first carrier bandwidth, and wherein the operations further comprise:

repeating the transmitting, the buffering, the converting, and the determining for a second uplink test signal associated with a second carrier bandwidth that is not the first carrier bandwidth, resulting in a second uplink time delay associated with the second carrier bandwidth.

19. The system of claim 16, wherein the operations further comprise:

storing the uplink time delay in a data store associated with the radio unit.

20. The radio unit equipment of claim 1, wherein the clock generation logic obtains the timing adjustment parameter from a database, and wherein the database stores timing adjustment parameters, comprising the timing adjustment parameter and respectively corresponding to carrier bandwidths comprising the carrier bandwidth utilized by the radio unit equipment.

\* \* \* \* \*